United States Patent [19] [11] 3,979,637
Siegmund [45] Sept. 7, 1976

[54] MICROCHANNEL PLATES AND METHOD OF MAKING SAME
[75] Inventor: Walter P. Siegmund, Woodstock, Conn.
[73] Assignee: American Optical Corporation, Southbridge, Mass.
[22] Filed: Nov. 8, 1971
[21] Appl. No.: 199,816

[52] U.S. Cl. .................. 315/12 R; 313/105 CM; 65/4 B; 313/103 CM
[51] Int. Cl.² .......................................... H01J 29/41
[58] Field of Search ................... 313/103, 105 CM; 250/96 B, 96 T; 65/4; 315/10, 11, 12

[56] References Cited
UNITED STATES PATENTS

| | | | |
|---|---|---|---|
| 3,247,756 | 4/1966 | Siegmund | 350/96 B X |
| 3,275,428 | 9/1966 | Siegmund | 65/4 |
| 3,426,147 | 2/1969 | McNaney | 350/96 B X |
| 3,436,142 | 4/1969 | Siegmund et al. | 350/96 B |
| 3,544,715 | 12/1970 | Herriott et al. | 350/96 B |
| 3,558,377 | 1/1971 | Tantillo | 65/4 |
| 3,574,582 | 4/1971 | Siegmund et al. | 350/96 B |
| 3,591,255 | 7/1971 | Ploss | 350/96 B X |
| 3,607,322 | 9/1971 | Brady et al. | 350/96 B X |
| 3,633,031 | 1/1972 | Pesce et al. | 350/96 B |
| 3,650,780 | 3/1972 | Connelly | 350/96 B |
| 3,673,457 | 6/1972 | Sackinger et al. | 315/12 |
| 3,677,730 | 7/1972 | Deradoorian et al. | 65/4 X |

Primary Examiner—Samuel W. Engle
Assistant Examiner—Peter A. Nelson
Attorney, Agent, or Firm—William C. Nealon

[57] ABSTRACT

Microchannel electron-multiplying plates formed of large numbers of glass-clad glass fibers all bundled tightly together in side-by-side relationship with each other and having their core sections removed for producing electron multiplying channels through the plates. Each channel has an electrically semiconductive inner wall surrounded by an electrical insulating glass for preventing cross-talk of electrical energy between electron multiplying channels of the plates when the plates are in use.

8 Claims, 9 Drawing Figures

MICROCHANNEL PLATES AND METHOD OF MAKING SAME

BACKGROUND OF THE INVENTION

1. Field of the Invention

Electron multiplier components with particular reference to etched microchannel plates formed of glass.

2. Description of the Prior Art

Etched microchannel plates intended for use in electron multipliers have, heretofore, been formed of glass-clad glass fibers having readily etchable core parts. After bundling togehter, fusing and drawing of the fibers to a desired reduced size, cores of the fibers are etched away to produce electron-multiplying channels through the plates. The fiber cladding material thus makes up the supporting structure of the plate in each case and walls of its channels. This fiber cladding material is normally formed of a leadcontaining glass which is rendered electrically semiconductive by activation in a reducing atmosphere whereby an electrical potential imposed along walls of the channels attracts electrons thereinto and accelerates these and secondary electrons produced in the channels in a manner, and for purposes, well known and understood in the art. For greater details of principles involving electron multiplication with microchannel devices, reference may be made to U.S. application Ser. No. 832,552, filed June 4, 1969.

Drawbacks related to microchannel plates of the aforementioned prior art type have related, at least in part, to unavoidable cross-talk (i.e. transference) of electrical energy from one or more channels to one or more other channels. In addition to adulterating electrical signals from channels so giving up or receiving excesses of electrons, and consequently similarly affecting the total output signal of the plate, such cross-talk of electrical energy has also been found to produce scintillation as background interference (i.e. noise) in the output of the plate. This appears in optical images which are produced by conversion of the plate's electrical output into light.

The present invention deals with matters of providing ample thickness of electrically conductive material along walls of channels of microchannel electron multiplying plates for conducting electrical energy through the plates while, at the same time, preventing cross-talk of electrical energy between channels.

SUMMARY OF THE INVENTION

The aforementioned and related objectives of this invention are accomplished by making microchannel plates of bundles of fibers having readily selectively etchable cores, first claddings of lead-containing glasses and second claddings of glasses which are non-conductive to electricity. These second claddings are preferably much thinner than the first claddings of lead-containing glass. Removal of cores of all fibers by etching produces the subject channel structure and subsequent activation of the lead-containing glass along exposed channel walls renders these walls electrically semi-conductive, each being outwardly surrounded by a thin web-like structure of the electrical insulating glass. This web of electrically insulating glass protects against cross-talk of electrical energy between channels of the plate structure.

Accordingly, the present invention features microchannel plates having relatively large thicknesses of electrically semi-conductive glasses surrounding each channel opening for the purpose of assuring good electrical conductivity along channel walls and minimal amounts of electrical insulating glass for preventing cross-talk of electrical energy between channels with minimal bulk of web material between channels.

Details of this invention will become more readily apparent from the following description when taken in conjunction with the accompanying drawing.

DESCRIPTION OF THE PREFERRED EMBODIMENTS

Figure 1:
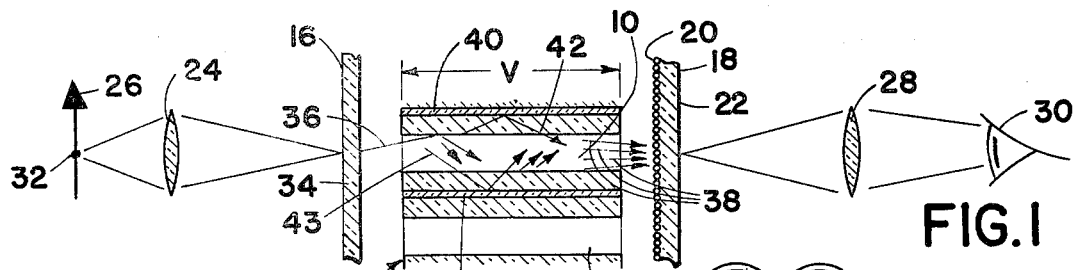
FIG. 1 is a schematic illustration of principles of operation of microchannel plates formed according to this invention.

In FIG. 1 of the drawings, two channels 10 and 12 of an exemplary microchannel plate 14 are illustrated diagrammatically. These channels 10 and 12 are extremely exagerated in size for ease and clarity of illustrating principles of the operation of microchannel plate 14.

In one useful application of a microchannel plate such as plate 14, it is interposed between an electron-emissive photocathode 16 and an electron-to-light transducing plate 18 (e.g. a layer of a phosphor 20 on a plate of glass 22) for the purpose of receiving and amplifying (by electron multiplication) image-forming electrons in an image intensifying system. Typical of such a system is that illustrated schematically in FIG. 1 wherein objective lens means 24 receives and forms an image of an object 26 upon photocathode 16 and an amplified or intensified image produced by photocathode 16, microchannel plate 14 and electron-to-light conversion plate 18 is observable with eyepiece lens means 28 or the eye 30 alone.

In operation according to principles of the present invention, the system of FIG. 1 functions as follows:

Point 32 on object 26, which is exemplary of one part of object 26, is imaged at 34 on photocathode 16 causing cathode 16 to emit one or more electrons illustrated by arrow 36. Considering arrow 36 as illustrating a single electron, a voltage V (e.g. 1000 V) applied across plate 14 causes electron 36 to be attracted into channel 10 of plate 14. In striking the wall of channel 10, electron 36 causes secondary electrons to become released from the wall and accelerated through channel 10. These secondary electrons, in turn, each cause the release of additional electrons, and so on, with the result of emergence of a multiplicity of electrons 38 from channel 10 upon phosphor 20. This multiple emission of electrons from plate 14 consitutes an amplified signal initiated by, for example, the aforementioned single electron 36. Thus, the source of light produced by emitting electrons 38 constitutes a high intensity image of object point 32 which may be viewed with eye 30. Accordingly, with all points of object 26 similarly imaged upon photocathode 16, and the resulting images similarly amplified in intensity, overall intensification of the total image of object 26 is accomplished.

With further reference to FIG. 1, web 40 of electrically insulating glass surrounds all channels (e.g. channels 10 and 12) of plate 14. Thus, accordng to principles of the present invention, cross-talk or transference of electrical energy from one such channel to other channels is prevented. For example, electrical energy depicted by arrows 42 and 43, even when entering into and passing through the semi-electrically conductive side walls of channel 10, is deflected back into channel 10, or at least prevented from reaching adjacent channels. This not being the case in prior art structures has resulted in adulteration of signals produced by the electron multiplying channels of such channel plates. Electrons intended to represent a point such as 32 of an object 26 in one channel (e.g. channel 10) tending to cross over into other channels or incite spurious elelctrical emissions in such other channels interfere with electron signals produced in the said other channels.

Additionally, it has been found that the aforementioned cross-talk of electrical energy in microchannel plates produces an electrical "noise" which tends to cause background scintillation in images produced upon plate 18.

Figure 2:
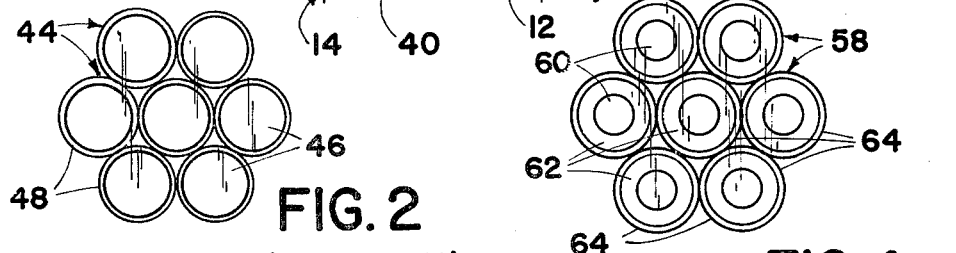
FIGS. 2 and 3 are face views of embodiments of prior art types of structures which are shown for the purpose of more clearly illustrating the aims and advantages of the present invention and its structural distinctiveness.
Figure 3:
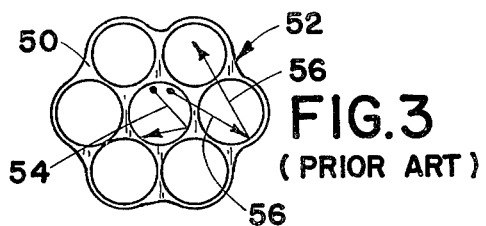

The aforementioned problems concerning prior art structures may be more readily understood by reference to FIGS. 2 and 3. Therein, a bundle of glass-clad glass fibers (FIG. 2) which, when all fused together and core sections 46 thereof are removed as by etching (FIG. 3) result in a honeycomb or channel structure. The original claddings 48 of fibers 44 form an integral matrix which constitutes the supporting structure 50 of a resulting prior art type of channel plate 52. Claddings 44 being formed of a lead-containing glass, as is usual in such cases, and activated in a reducing atmosphere to render their surfaces electrically semi-conductive, permit cross-talk of electrical energy between channels as indicated diagrammatically by arrows 56. Arrows 54 illustrate the normal intended reflection and secondary emission of electrons.

It should be understood that the illustrations of bundle 44 and channel plate 52 are shown with respective fibers being excessively large in cross-sectional size and extremely few in number as opposed to the usual extremely small fiber diameter size of only a few thousandths of an inch or less and being many hundreds and usually thousands in number. This showing of only a small number of fibers and exageration of size has been done for purposes of clarity in illustrating principles involving the present inventive concept. The improvement of the present invention is, for ease of comparison, with the prior art, illustrated in FIGS. 4, 5, 6 and 9 as being similarly exagerated in size.

Referring more particularly to the improvement of the present invention, a number of fibers 58 are all initially tightly bundled together in side-by-side relationship with each other in the usual manner of forming assemblies for making microchannel plates. In this case, however, each fiber comprises, in addition to the usual removable core section 60 and the first cladding 62 of lead-containing glass, a relatively thin cladding 64 of an electrical insulating glass.

Typical of glasses contemplated for use in the structure of each of fibers 58 are: a soluble lanthenum crown glass which is acid-leachable for cores 60; a lead flint glass containing from 50 to 60 percent lead, for example, for the first claddings 62 and a conventional soda-lime glass for the electrically insulating outermost cladding 64. Exemplary proportions of glasses used in fibers 58 are: approximately 40% leachable core glass; approximately 55% lead-containing first cladding glass; and approximately 5% electrically insulating second cladding glass.

Figure 4:
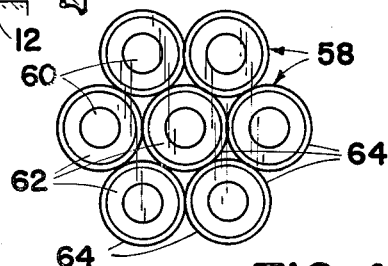
FIGS. 4 and 5 are face views of an embodiment of the present invention showing preliminary and intermediate stages of construction of channel plates according to the invention.
Figure 5:
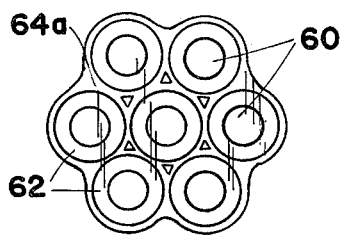

Fibers 58 of FIG. 4 are all fused together as diagrammatically illustrated in FIG. 5 wherein outermost claddings 64 of these fibers form electrical insulating web 64a of glass which completely surrounds each first cladding of leadcontaining glass.

Figure 6:
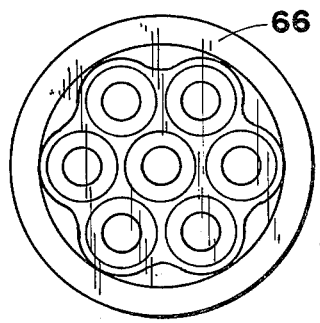
FIG. 6 illustrates a face view of the structure shown in FIGS. 4 and 5 as having been secured within an annulus of glass.
Figure 7:
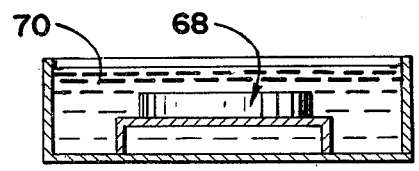
FIGS. 7 and 8 illustrate treatment of plate segments of the structure shown in FIG. 6.

As it is usual, but not necessary to the improvement of this invention, the fused together structure of FIG. 5 is relatively long and sheathed within a tube of supporting glass 66. This tube is glass-soldered or directly fused to the fiber assembly as illustrated in FIG. 6. The sheathed assembly is then cut transversely into wafer-like sections, each of which is intended to ultimately comprise a microchannel plate. One such section is illustrated in FIG. 7 as plate 68.

Figure 9:
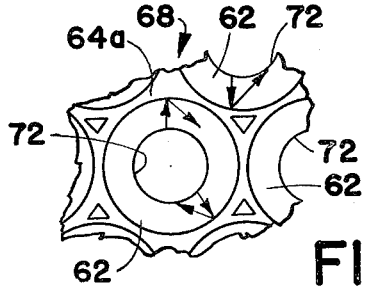
FIG. 9 is an enlarged fragmentary plan view of a finished embodiment of the invention.

Exemplary plate 68 is immersed in a suitable acid bath 70 for a period of time sufficient to completely remove the cores 60 of all fused together fibers thereof thus forming channels 72 through plate 68 (see FIG. 9). These channels 72 constitute the aforementioned electron multiplying channels of the ultimate plate structure.

In rendering channels 72 properly semi-conductive to electrical energy for the purpose discussed hereinabove, the etched plate 68 is placed within a suitable reducing atmosphere of, for example, hydrogen at a temperature of approximately 680°F. The plate is held in this reducing atmosphere for a period of approximately 9 hours, raised to a temperature of approximately 825°F for a period of approximately 5 minutes and then cooled to room temperature in an oxygen-free environment.

Figure 8:
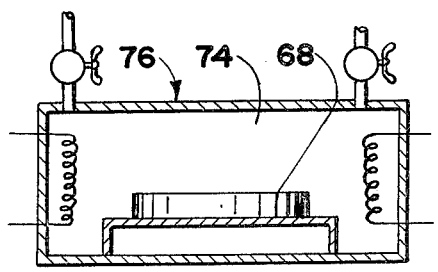

A gas-tight heating chamber 76 is illustrated in FIG. 8 as exemplary means within which activation of the lead-containing first claddings 62 of plate 68 may be accomplished; it being understood that due to the above described etching operation, claddings 62 make up the side walls of channels 72 (FIG. 9). Each energy conducting channel 72 (FIG. 9) is completely insulated from adjacent surrounding similar channels by thin web 64a of electrical insulating glass. This web, with minimum bulk between channels 62, prevents cross-talk of electrical energy and accordingly, overcomes prior art problems of cross-talk (i.e. cross-channel interference). By such means, an overall gain of intensity and definition of images produced by electron multiplication in plate 68 is accomplished with prevention of electrical noise and scintillation in images produced by systems using microchannel plates 68.

I claim:
1. A multichannelled structure comprising;
    a plate formed of at least two differently characterized glasses intimately bonded together by fusion;
    a first of said glasses being at least partially conductive to electrical energy and comprising a multiplicity of individually spaced apart parallel tubular components each of substantial wall thickness, the opening internally of each tubular component forming a channel through said plate; and a second of said glasses being an electrical insulating glass, said second glass comprising the structure of a web of interconnected sections, one section encircling each tubular component with substantially less thickness of glass than said wall thickness of said tubular component in each case.

2. A device according to claim 1 wherein said electrically conductive glasses of said parallel tubular components contain lead.

3. The device according to claim 2 wherein said lead-containing glasses are comprised of from 50 to 60 percent lead.

4. The device according to claim 2 wherein said second electrical insulating glass is a soda-lime glass.

5. A device according to claim 1 wherein said first glasses of said parallel tubular components occupy approximately 55 percent of a unit cross-sectional area of said plate, said second glass occupies approximately 5 percent of said cross-sectional area and the remainder of said cross-sectional area is comprised of the spaces of inner diametral openings through said tubular components.

6. The method of making a microchannel plate comprising the steps of:

assembling a plurality of relatively long and thin elements of glass each having a core of a removable glass, a first relatively thick cladding of a lead-containing glass and a second relatively thin cladding of an electrical insulating glass, all such elements being placed in parallel side-by-side relationship with each other;

heating and fusing said elements together as a unit with glasses of said second claddings forming an interconnected web structure surrounding each of said first claddings;

removing said cores of said elements from the fused unit leaving said first claddings as walls of channels extending therethrough; and subjecting the thus channelled unit to a reducing atmosphere for rendering surfaces of said walls semi-conductive to electricity.

7. The method according to claim 6 including the step of drawing said assembled plurality of elements to reduced cross-sectional size prior to said step of removing said cores of said elements.

8. The method according to claim 7 further including the step of cutting said drawn plurality of elements transaxially into relatively thin sections.

* * * * *